United States Patent
Yamada

(10) Patent No.: US 11,086,411 B2
(45) Date of Patent: Aug. 10, 2021

(54) CHARACTER INPUT DEVICE, CHARACTER INPUT METHOD, AND CHARACTER INPUT PROGRAM FOR PREDICTIVE SUGGESTIONS

(71) Applicant: OMRON Corporation, Kyoto (JP)

(72) Inventor: Takahiro Yamada, Kyoto (JP)

(73) Assignee: OMRON Corporation, Kyoto (JP)

( * ) Notice: Subject to any disclaimer, the term of this patent is extended or adjusted under 35 U.S.C. 154(b) by 142 days.

(21) Appl. No.: 16/278,773

(22) Filed: Feb. 19, 2019

(65) Prior Publication Data

US 2019/0272044 A1  Sep. 5, 2019

(30) Foreign Application Priority Data

Mar. 5, 2018 (JP) .............................. JP2018-038933

(51) Int. Cl.
*G06F 3/023* (2006.01)
*G06F 3/0488* (2013.01)

(52) U.S. Cl.
CPC ........ *G06F 3/0237* (2013.01); *G06F 3/04886* (2013.01)

(58) Field of Classification Search
CPC .. G06F 3/0237; G06F 3/04886; G06F 3/0233; H04M 2250/70
See application file for complete search history.

(56) References Cited

U.S. PATENT DOCUMENTS

| | | | | |
|---|---|---|---|---|
| 8,762,356 | B1* | 6/2014 | Kogan | G06F 7/00 707/705 |
| 2012/0167009 | A1* | 6/2012 | Davidson | G06F 3/0237 715/816 |
| 2014/0062886 | A1* | 3/2014 | Pasquero | G06F 3/04886 345/168 |
| 2014/0067372 | A1* | 3/2014 | Pasquero | G06F 40/274 704/9 |
| 2014/0333549 | A1 | 11/2014 | Suemune | |
| 2016/0041754 | A1* | 2/2016 | Rhee | G06F 3/0237 715/773 |
| 2016/0077734 | A1* | 3/2016 | Buxton | G06F 3/0233 715/773 |
| 2018/0081539 | A1* | 3/2018 | Ghassabian | G06F 3/04886 |

FOREIGN PATENT DOCUMENTS

WO  2012/161223 A1  11/2012

\* cited by examiner

*Primary Examiner* — Daniel W Parcher
(74) *Attorney, Agent, or Firm* — Metrolex IP Law Group PLLC

(57) ABSTRACT

A character input device for character input reflecting a user's situation includes an operation unit that receives an input operation associated with a character input, a detector that detects an operating speed for the input operation, and a predictive suggestion generation unit that outputs predictive suggestions for the character input in accordance with the operating speed.

5 Claims, 4 Drawing Sheets

CHARACTER INPUT DEVICE, CHARACTER INPUT METHOD, AND CHARACTER INPUT PROGRAM FOR PREDICTIVE SUGGESTIONS

CROSS-REFERENCE TO RELATED APPLICATION

This application claims priority to Japanese Patent Application No. 2018-038933 filed on Mar. 5, 2018, the contents of which are incorporated herein by reference.

FIELD

The disclosure relates to a technique for inputting characters on a touchscreen input device.

BACKGROUND

Patent Literature 1 describes a technique for predicting characters to be input and displaying suggestions predicted from one or more input characters.

CITATION LIST

Patent Literature

Patent Literature 1: WO 2012/161223

SUMMARY

Technical Problem

However, the structure described in Patent Literature 1 may display suggestions for character input without reflecting the situation in which the user inputs characters, and may output inappropriate prediction results.

One or more aspects are directed to a technique for enabling character input reflecting the user's situation.

Solution to Problem

A character input device according to one or more aspects includes an operation unit that receives an input operation associated with a character input, a detector that detects an operating speed for the input operation, and a predictive suggestion generation unit that outputs predictive suggestions for the character input in accordance with the operating speed.

This structure outputs predictive suggestions for character input reflecting the operating speed of the user, thus improving user convenience.

The character input device may output the predicative suggestions sorted to reflect the operating speed.

This structure determines the output order of predicative suggestions in accordance with the operating situation of the user.

The predictive suggestion generation unit included in the character input device may sort the predictive suggestions in an order of more characters when the operating speed is higher than a threshold.

This structure displays predicative suggestions in the order convenient to the user.

The character input device may further include a storage that stores the operating speed and the threshold calculated from the operating speed.

This structure stores the actual use situation for the user.

The character input device may further include a speed estimation unit that compares the operating speed with the threshold.

This structure compares the current operating speed with the threshold to effectively reflect the actual use situation for the user.

Advantageous Effects

The technique according to the above aspects enables character input reflecting the user's situation.

DETAILED DESCRIPTION

Embodiments will now be described with reference to the drawings.

Example Use

Figure 1:
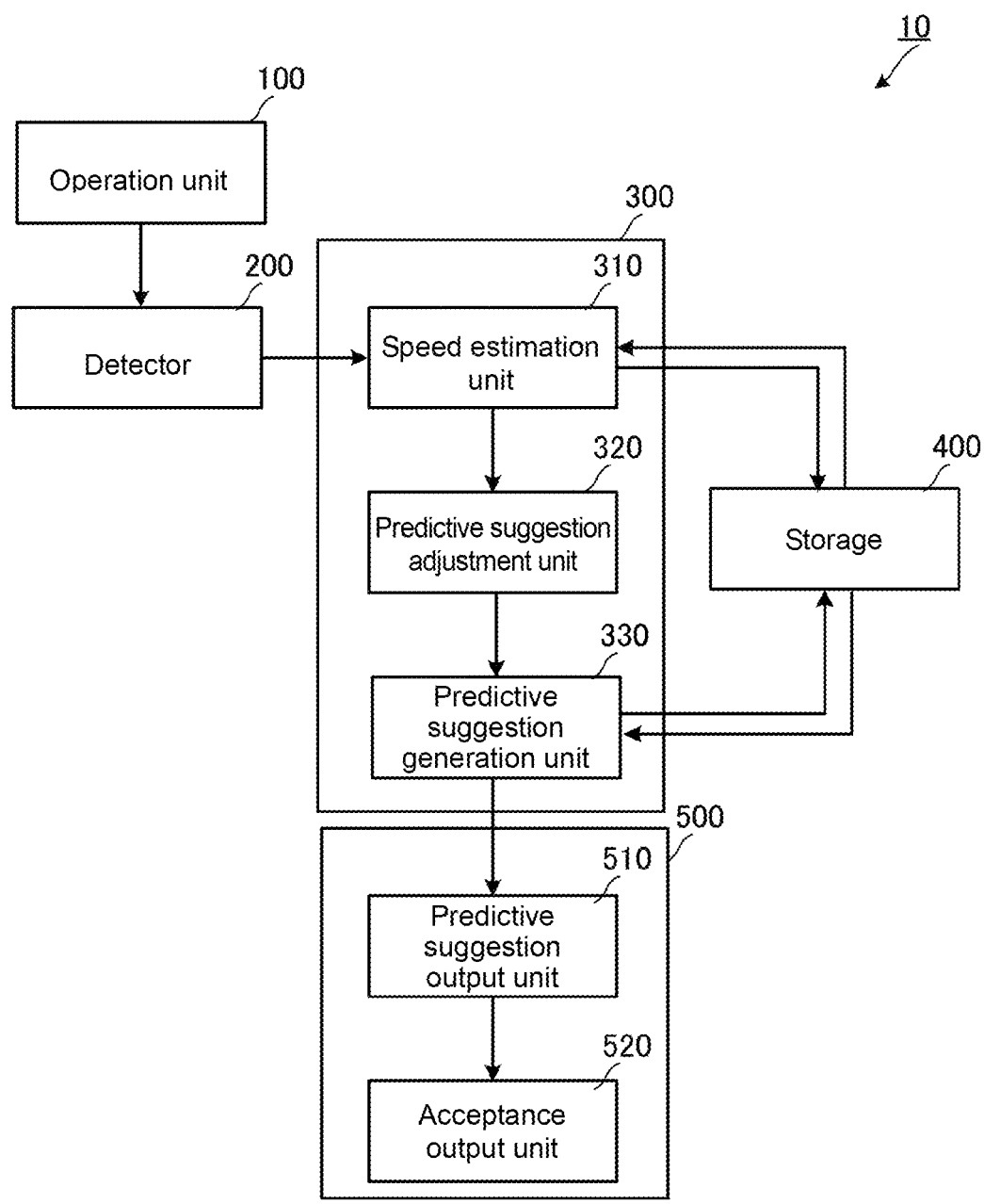
FIG. 1 is a block diagram illustrating a character input device according to a first embodiment.

An embodiment will be described first with reference to FIG. 1. FIG. 1 is a block diagram of a character input device according to a first embodiment. A character input device 10 is installed in, for example, a mobile communication terminal such as a smartphone, and allows a user to input characters by performing an operation on a touchscreen display.

The character input device 10 includes an operation unit 100, a detector 200, a controller 300, a storage 400, and a character output unit 500. The controller 300 includes a speed estimation unit 310, a predictive suggestion adjustment unit 320, and a predictive suggestion generation unit 330. The character output unit 500 includes a predictive suggestion output unit 510 and an acceptance output unit 520. The operation unit 100 is, for example, a software keyboard.

The storage 400 stores, for example, dictionary information and user-specific information. The user-specific information includes, for example, frequent conversion suggestions and a threshold for the speed at which the user performs an operation (hereafter, an operating speed). The threshold will be described in detail later.

The operation unit 100 receives an operation performed by a user. The detector 200 detects the user operation on the operation unit 100. The detector 200 calculates the operating speed.

The speed estimation unit 310 compares the operating speed detected by the detector 200 with the threshold stored in the storage 400. The speed estimation unit 310 may determine that the current operating speed is higher than the threshold. In this case, the speed estimation unit 310 determines that the user is in a hurry. The speed estimation unit 310 outputs the user's mode of character input as a quick mode to the predictive suggestion adjustment unit 320.

When receiving information indicating the quick mode, the predictive suggestion adjustment unit 320 selects a criterion for determining the output order of predictive suggestions, and outputs the criterion to the predictive suggestion generation unit 330. For the quick mode, the predictive suggestion adjustment unit 320 sorts predictive suggestions in the order of more characters included in each suggestion.

The predictive suggestion generation unit 330 obtains predictive suggestions from the storage 400, and sorts the suggestions in the order based on the criterion. The predictive suggestion generation unit 330 outputs the sorted predictive suggestions to the predictive suggestion output unit 510.

The predictive suggestion output unit 510 displays the predictive suggestions. When the user selects one predictive suggestion output to the predictive suggestion output unit 510, the predictive suggestion output unit 510 outputs the selected character(s) to the acceptance output unit 520.

This structure enables character input reflecting the user's operating speed, thus improving user convenience. A user in a hurry to input characters may either intend to input many characters or intend to minimize the number of characters to be input. The user is thus likely to select a predictive suggestion including more characters. This structure enables character input reflecting the user's situation, thus improving user convenience.

Example Structure 1

Figure 2:
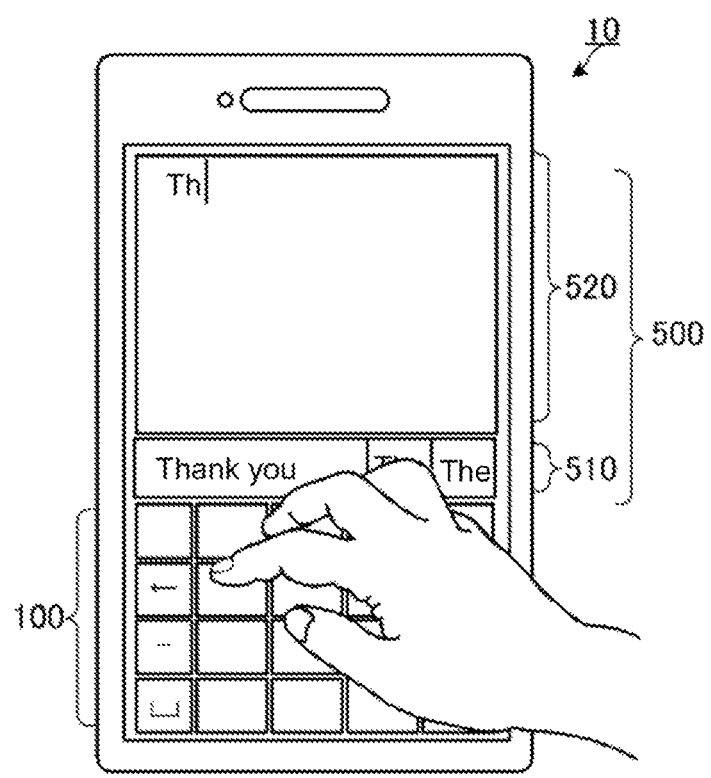
FIG. 2 is a schematic diagram illustrating a character input device according to a first embodiment.
Figure 3:
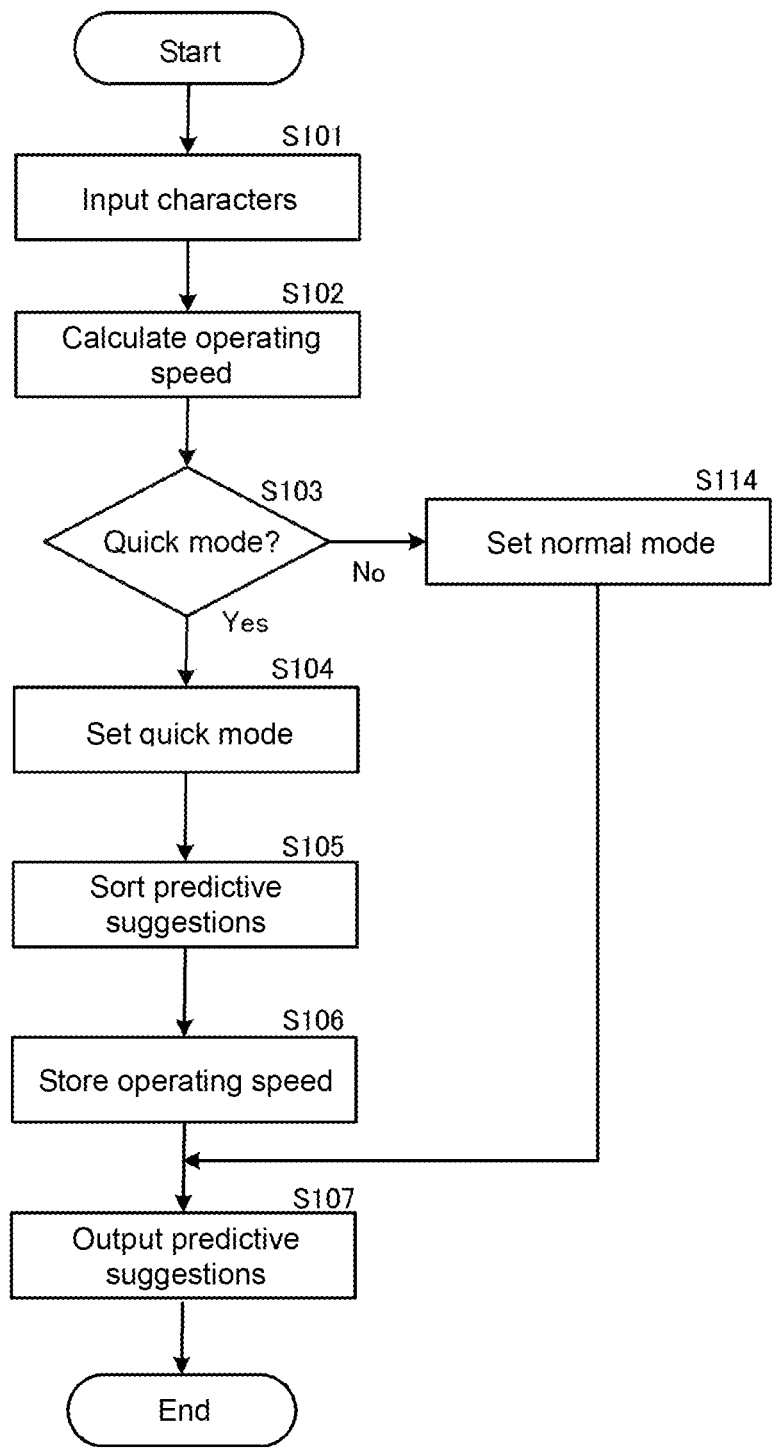
FIG. 3 is a flow diagram illustrating an operation of a character input device according to a first embodiment.

FIG. 1 is a block diagram of a character input device according to a first embodiment. FIG. 2 is a schematic diagram of the character input device according to a first embodiment. FIG. 3 is a flowchart showing the operation of the character input device according to a first embodiment.

An example structure will be described in more detail with reference to FIG. 2 based on the structure of the character input device 10 shown in FIG. 1.

As shown in FIGS. 1 and 2, the character input device 10 includes the operation unit 100 and the character output unit 500. The character output unit 500 includes the predictive suggestion output unit 510 and the acceptance output unit 520. The acceptance output unit 520 accepts a selected predictive suggestion and displays the suggestion.

In the specific example described below, the user intends to input the characters "Thank you" quickly. The user inputs "Th" using the operation unit 100.

The detector 200 detects the operating speed at which the characters "Th" are input. The detector 200 outputs the operating speed to the speed estimation unit 310. The speed estimation unit 310 compares the operating speed (hereafter, the current operating speed) with the threshold stored in the storage 400.

The speed estimation unit 310 determines that the current operating speed is higher than the threshold, and determines that the input mode to be the quick mode. The speed estimation unit 310 outputs information indicating the quick mode to the predictive suggestion adjustment unit 320.

The threshold may be an average operating speed for past character inputs. The threshold may be a maximum operating speed for past character inputs or may be a statistically derived operating speed calculated from past character inputs.

When receiving information indicating the quick mode, the predictive suggestion adjustment unit 320 determines the criterion to sort predictive suggestions in the order of more characters, and outputs the criterion to the predictive suggestion generation unit 330.

For example, the predictive suggestion generation unit 330 obtains predictive suggestions including "This," "The," and "Thank you" from the storage 400. For a normal mode, the predictive suggestion generation unit 330 displays these predictive suggestions in the order of "This," "The," and "Thank you."

For the quick mode, the predictive suggestion generation unit 330 sorts the predictive suggestions in the order of from more characters to fewer characters, namely, in the order of "Thank you," "This," and "The."

The predictive suggestion generation unit 330 outputs the suggestions to the predictive suggestion output unit 510 in this order of "Thank you," "This," and "The." The user selects "Thank you" appearing on the predictive suggestion output unit 510. The predictive suggestion output unit 510 then outputs "Thank you" to the acceptance output unit 520.

An operation using the character input device will be described in detail with reference to FIG. 3 based on the structure described above. FIG. 3 is a flowchart showing the operation of the character input device according to a first embodiment.

The operation unit 100 receives a character input (S101).

The detector 200 calculates the operating speed at which characters are input (S102).

The speed estimation unit 310 compares the operating speed with the threshold stored in the storage 400 to determine whether the input mode is the quick mode (S103).

When determining that the input mode is the quick mode (Yes in S103), the speed estimation unit 310 sets the current character input mode to the quick mode (S104).

The predictive suggestion adjustment unit 320 sets the order of more characters for the predictive suggestions. The predictive suggestion generation unit 330 then sorts the predictive suggestions obtained from the storage 400 in the order of more characters (S105).

The storage 400 stores the operating speed for subsequent setting of the threshold (S106).

The character output unit 500 outputs the predictive suggestions (S107).

When determining that the input mode is not the quick mode (No in S103), the speed estimation unit 310 sets the current character input mode to the normal mode (S114). The character output unit 500 outputs the predictive suggestions in the normal mode (S107).

The above structure enables character input reflecting the user's operating speed. The operating speed stored for subsequent use allows the threshold to reflect the actual operating speed. Thus, the structure enables character input reflecting the user's actual situation, improving user convenience.

Example Structure 2

Figure 4:
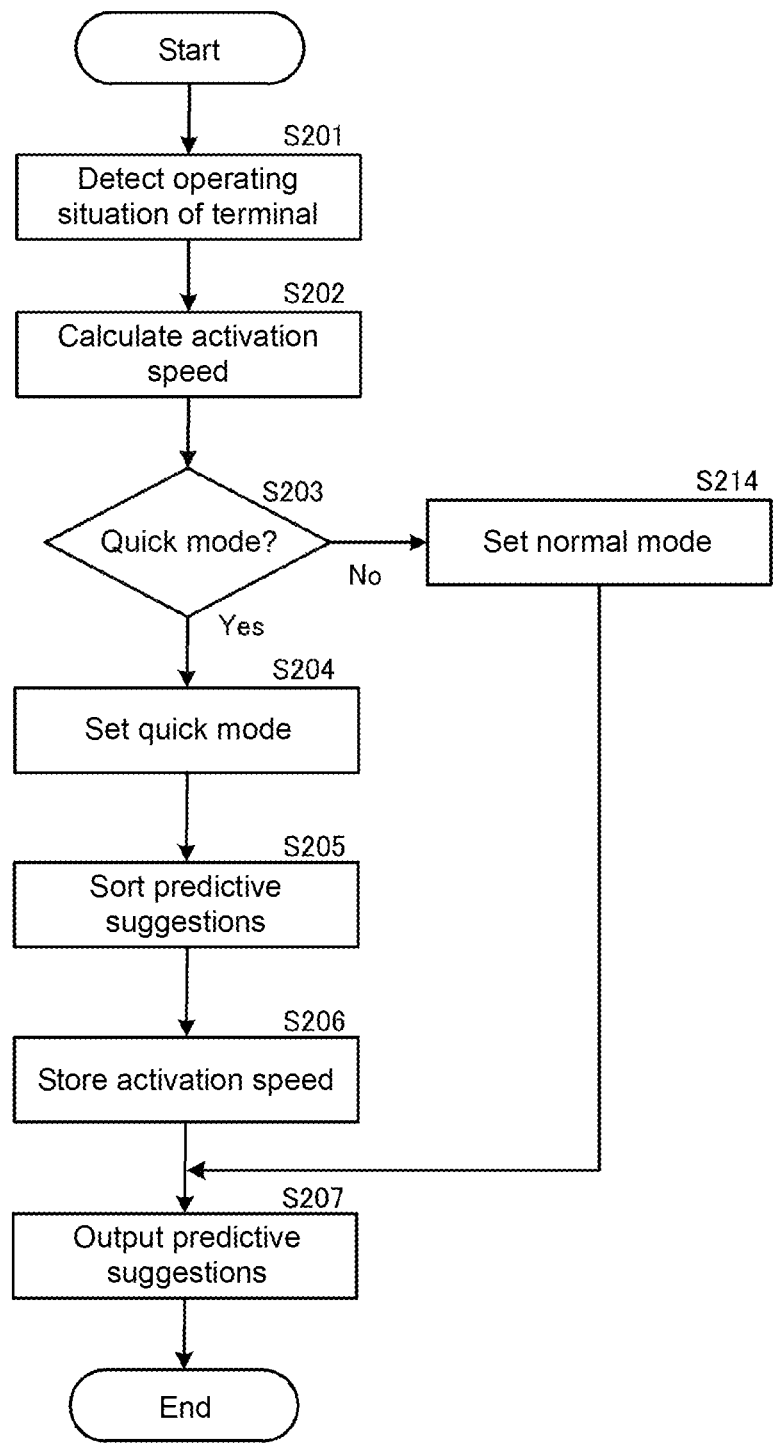
FIG. 4 is a flow diagram illustrating an operation of a character input device according to a second embodiment.

An operation using a character input device will now be described in detail with reference to FIG. 4. FIG. 4 is a flowchart showing the operation of a character input device according to a second embodiment.

A second embodiment differs from a first embodiment in the method for determining the operating speed. The other components and processes are the same as those in a first embodiment, and will not be described.

In a second embodiment, a character input device 10A may have an email application installed for sending, receiving, and displaying email messages. The user receives and replies to email messages. The user replies to email messages (inputs characters) by operating an operation unit 100 with the email application.

The user activates the email application installed in the character input device 10A. The user inputs characters using the operation unit 100. A detector 200 detects the time taken from the activation of the email application to the input of characters with the operation unit 100 (hereafter, an activation speed) (S201).

The detector 200 calculates the activation speed (S202).

A speed estimation unit 310 compares the activation speed with a threshold stored in a storage 400 to determine whether the input mode is the quick mode (S203).

When determining that the input mode is the quick mode (Yes in S203), the speed estimation unit 310 sets the current character input mode to the quick mode (S204).

A predictive suggestion adjustment unit 320 sets the order of more characters for the predicative suggestions. The predictive suggestion generation unit 330 then sorts the predictive suggestions obtained from the storage 400 in the order of more characters (S205).

The storage 400 stores the activation speed for subsequent setting of the threshold (S206).

A character output unit 500 outputs the predictive suggestions (S207).

When determining that the input mode is not the quick mode (No in S203), the speed estimation unit 310 sets the current character input mode to the normal mode (S214). The character output unit 500 outputs the predictive suggestions in the normal mode (S207).

The above structure enables the user's character input reflecting the activation speed of the application. The activation speed stored for subsequent use allows the threshold to reflect the actual activation speed. The structure enables character input reflecting the user's actual situation or operation associated with, for example, activation of an application, thus improving user convenience.

Although the operation on the software keyboard described in the above examples is based on the operating speed or the activation speed, the threshold may be determined using other information associated with the character input device, such as an acceleration obtained by an acceleration sensor, positional information, and the number of times an application is activated within a predetermined period.

The invention claimed is:

1. A character input device, comprising a controller configured with a program to perform operations comprising:
   providing, on a touchscreen, an operation unit configured to receive an input operation associated with a character input;
   operation as a detector configured to detect an operating speed of the input operation, and an activation speed based on a time from an opening of an application in which the character input is received to a time of the input operation;
   operation as a speed estimation unit configured to:
      compare the operating speed with a first threshold and the activation speed with a second threshold;
      enter a normal mode in response to the operating speed being less than the first threshold, and the activation speed being less than the second threshold; and
      in response to the normal mode having not been entered, enter a quick mode; and
   operation as a predictive suggestion generation unit configured to:
      in response to the quick mode having been entered, output predictive suggestions for the character input, which are sorted such that the predictive suggestions are output in an order of from more characters to fewer characters; and
      in response to the normal mode-having been entered, output the predictive suggestions for the character input in the normal mode in which the predictive suggestions are sorted in an order other than from more characters to fewer characters, based on user-specific information.

2. The character input device according to claim 1, further comprising:
   a storage storing the user-specific information, the activation speed, the operating speed, and the threshold, wherein the controller is configured with the program to calculate the threshold from the operating speed.

3. A character input method implemented by a computer, the method comprising:
   receiving a character input;
   detecting an operating speed for the character input, and an activation speed based on a time from an opening of an application in which the character input is received to a time of the input operation;
   comparing the operating speed to a first threshold and the activation speed with a second threshold;
   entering a normal mode in response to the operating speed being less than the first threshold, and the activation speed being less than the second threshold;
   in response to the normal mode having not been entered, entering a quick mode;
   in response to the quick mode having been entered, outputting predictive suggestions for the character input, which are sorted such that the predictive suggestions are output in an order of from more characters to fewer characters; and
   in response to the normal mode having been entered, outputting the predictive suggestions for the character input in the normal mode in which the predictive suggestions are sorted in an order other than from more characters to fewer characters, based on user-specific information.

4. The method according to claim 3, further comprising calculating the threshold from the operating speed.

5. A non-transitory computer-readable storage medium storing a character input program, the program, which when read and executed, causes a computer to perform operations comprising:
   receiving a character input;
   detecting an operating speed for the character input, and an activation speed based on a time from an opening of an application in which the character input is received to a time of the input operation;
   comparing the operating speed to a first threshold and the activation speed with a second threshold;
   entering a normal mode in response to the operating speed being less than the first threshold, and the activation speed being less than the second threshold;
   in response to the normal mode having not been entered, entering a quick mode;
   in response to the quick mode having been entered, outputting predictive suggestions for the character input, which are sorted such that the predictive suggestions are output in an order of from more characters to fewer characters; and
   in response to the normal mode having been entered, outputting the predictive suggestions for the character input in the normal mode in which the predictive suggestions are sorted in an order other than from more characters to fewer characters, based on user-specific information.

* * * * *